United States Patent [19]

Perry et al.

[11] 4,262,319
[45] Apr. 14, 1981

[54] LIGHTNING ARRESTER FOR USE IN GAS INSULATED ELECTRICAL POWER DEVICE

[75] Inventors: E. Robert Perry, Portola Valley; Mario Rabinowitz, Menlo Park, both of Calif.

[73] Assignee: Electric Power Research Institute, Inc., Palo Alto, Calif.

[21] Appl. No.: 32,228

[22] Filed: Apr. 23, 1979

[51] Int. Cl.³ .............................................. H02H 3/22
[52] U.S. Cl. ...................................... 361/127; 338/21
[58] Field of Search ........................ 361/120, 126–128, 361/117; 315/36; 313/20, 24, 33, 35, 36, 39–41; 338/20–22, 53, 55, 57, 58

[56] References Cited

U.S. PATENT DOCUMENTS

| 2,166,951 | 7/1939 | Germer | 313/33 X |
| 3,275,893 | 9/1966 | Phillips et al. | 361/379 |
| 3,881,766 | 5/1975 | Pratsch | 361/127 X |
| 4,100,588 | 7/1978 | Kresge | 361/127 |

FOREIGN PATENT DOCUMENTS

| 2425814 | 12/1975 | Fed. Rep. of Germany | 338/21 |
| 963529 | 7/1950 | France | 361/128 |

Primary Examiner—Harry E. Moose, Jr.
Attorney, Agent, or Firm—Flehr, Hohbach, Test

[57] ABSTRACT

A gas cooled lightning arrester includes a plurality of zinc oxide blocks which are joined together to form serially connected non-linear resistors and capacitors. The blocks may be joined by clamps or metal plates may be bonded to the ends of the blocks. Cooling fins integral with the zinc oxide blocks or provided by the metal plates facilitate heat dissipation. The housing for the lightning arrester includes an inner wall which defines a channel for the convection flow of gas coolant.

9 Claims, 4 Drawing Figures

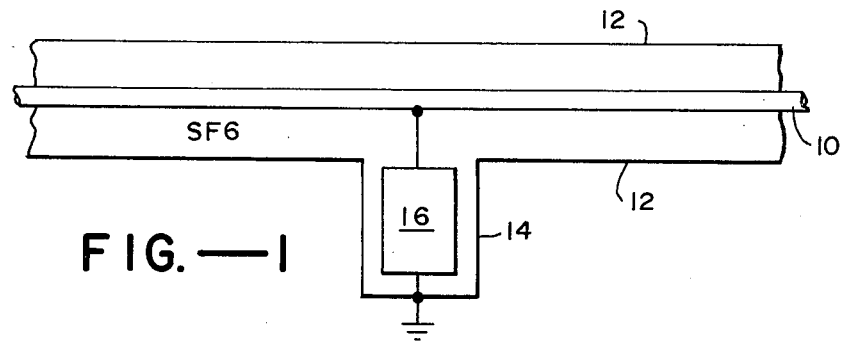
FIG.—1
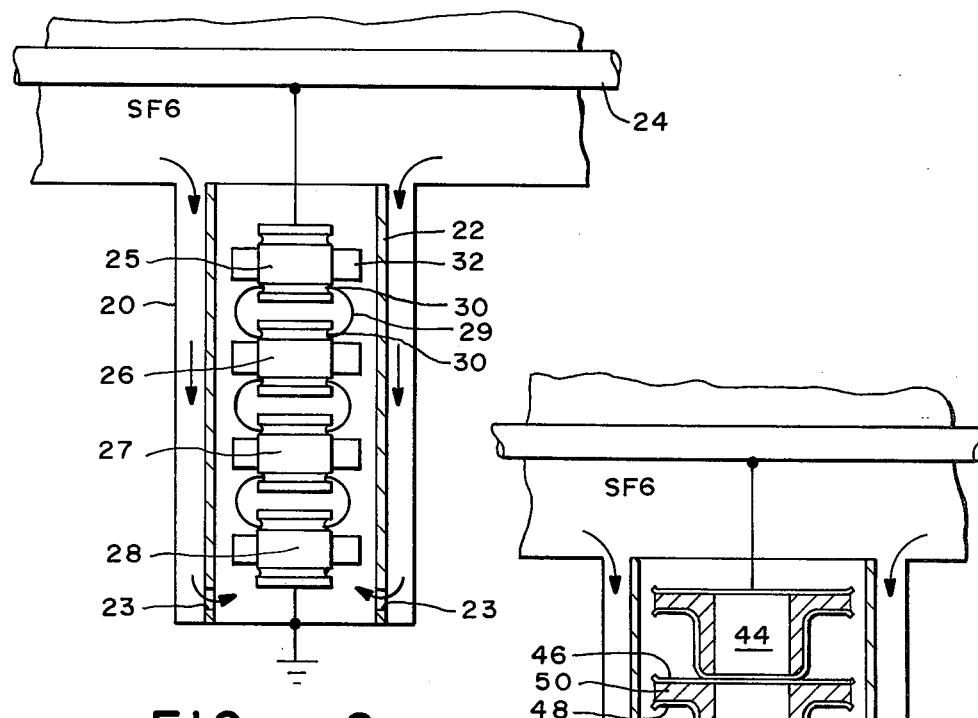
FIG.—2
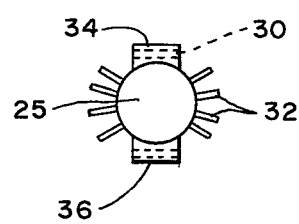
FIG.—3
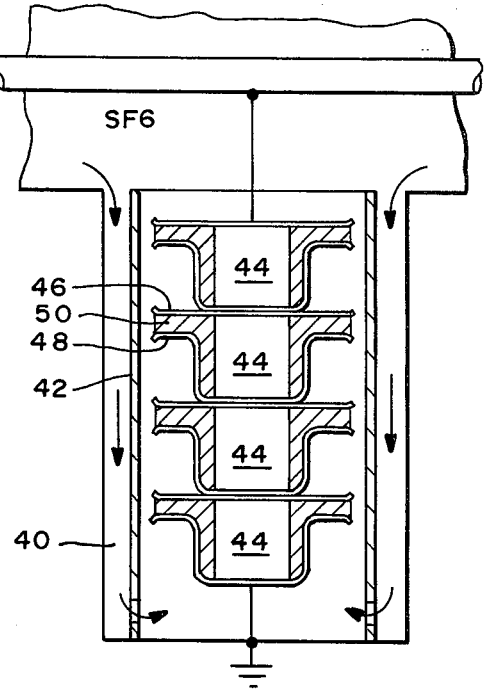
FIG.—4

LIGHTNING ARRESTER FOR USE IN GAS INSULATED ELECTRICAL POWER DEVICE

This invention relates generally to lightning arresters and more particularly the invention relates to a lightning arrester for use in a gas insulated electrical power device.

A standard lightning arrester as employed in electric power devices such as substations utilizes non-linear resistors such as silica carbide blocks in series multiple gap arrangement which function to dissipate to ground large surges in voltage and current.

Recently, enclosed substations which are electrically insulated and cooled by gas such as sulphur hexafluoride ($SF_6$) have been introduced. The standard lightning arresters utilizing silica carbide blocks and ($SF_6$) insulation have been used therewith, but adequate cooling of the lightning arrester while in the enclosed $SF_6$ environment has been difficult and expensive to implement.

Accordingly, an object of the present invention is an improved lightning arrester for use in a gas insulated electrical power device.

Another object of the invention is a solid state lightning arrester in which capacitive grading of the electric stress is built into the arrester geometry so as to also provide automatic cooling.

Another object of the invention is a lightning arrester with improved cooling by gas insulation within an electrical device.

Features of the invention include a plurality of insulation blocks which are serially connected by conductive means and form serially connected capacitors. The serially connected blocks are provided within a housing, and means is provided within the housing to facilitate the flow of gas about the insulative blocks.

In preferred embodiments, metallic plates are bonded to the ends of the insulative blocks with the metallic plates extending outwardly as heat dissipation fins. Alternate ones of the heat dissipation fins are cup shaped and closely spaced to adjacent fins to comprise part of the serially connected capacitors.

These and other objects and features of the invention will be more readily apparent from the following detailed description and appended claims when taken with the drawing.

In the drawing, FIG. 1 is a section view of an electrical power device and lightning arrester.

FIG. 2 is a side view in section of one embodiment of a lightning arrester in accordance with the present invention for use in the electrical device of FIG. 1.

FIG. 3 is an end view of a portion of the lightning arrester of FIG. 2.

FIG. 4 is a side view in section of another embodiment of a lightning arrester in accordance with the present invention useful in the device of FIG. 1.

Referring now to FIG. 1, a side view in section of a portion of an electrical power device such as a substation is shown. The device includes a high voltage transmission line 10 which is mounted within a housing including outer walls 12 with the housing filled with sulphur hexafluoride ($SF_6$) gas for insulation and cooling purposes. The outer wall 12 includes a portion 14 for accommodating a lightning arrester 16 which is electrically connected between the high voltage line 12 and the grounded housing walls 12 and 14. Typically, the lightning arrester comprises a plurality of serially connected non-linear resistors which dissipate large surges in voltage and current on the transmission line 10 due to disturbances such as lightning.

As noted above, the conventional lightning arrester utilizes silica carbide blocks in series multiple gap arrangement. Thus, it will be appreciated that the lightning arrester 16 of FIG. 1 includes a sealed housing for maintaining an insulating atmosphere for the lightning arrester. As indicated, the requirement for a sealed lightning arrester in the $SF_6$ atmosphere increases the expense and decreases the reliability of the lightning arrester of the prior art.

FIG. 2 is a side view in section of one embodiment of a solid state lightning arrester in accordance with the present invention which utilizes the $SF_6$ gas as a dielectric and for cooling. In this embodiment the housing 20 for the lightning arrester, which corresponds to housing 14 in FIG. 1, may be cylindrical in shape and includes an inner cylindrical wall 22 spaced from the walls of the housing 20 and defining a channel for the downward flow of $SF_6$ gas, as indicated by the arrows through openings 23 in wall 22. Mounted within the inner cylinder 22 is the lightning arrester which is electrically connected between the high voltage line 24 and the grounded housing wall 20 and includes a plurality of nonlinearly resistive blocks 25, 26, 27 and 28 which are serially connected in spaced alignment by means of clamps 29. Preferably, each of the blocks comprises zinc oxide and the clamps 29 comprise U-shaped spring steel which engages grooves 30 in adjacent blocks. Each of the zinc oxide blocks has heat dissipation fins 32 molded with the blocks to facilitate cooling of the lightning arrester by the conduction flow of the $SF_6$ gas when the lightning arrester is heated through the dissipation of a surge of power.

The zinc oxide blocks and the $SF_6$ gas in the gaps between adjacent blocks comprise a plurality of serially connected non-linear resistors which dissipate voltage and current surges on the high voltage line 24. The convection flow of the $SF_6$ gas cools the heated lightning arrester during the dissipation of power surges.

FIG. 3 is an end view of the zinc oxice block 25 and further illustrates the orientation of the heat dissipation fins 32 about the outer surface of the block. In addition, the block includes two projecting ears 34 and 36 on opposite sides of the block which each accommodate the grooves 30 for receiving the U-shaped clamps. In this embodiment, four clamps will be used at each end of the block for fastening the block to an adjacent block.

FIG. 4 is a side view in section of another embodiment of a lightning arrester in accordance with the present invention with both capacitive grading and convective cooling provided within a housing 40 having an inner cylindrical barrier 42 similar to the housing 20 and barrier 22 of FIG. 2. In this embodiment metallic plates 46, 48 are bonded to adjacent zinc oxide blocks 44 and extend therefrom as part of the capacitive plate and also as heat dissipation fins. Preferably, alternate plates 48 are cup shaped whereby the extended portion thereof is placed in close proximity to an adjacent plate 46 to increase the capacitance thereof. A high dielectric constant material 50 is placed between the plates to increase the capacitance and reduce the breakdown voltage thereof. Barium titanate with a dielectric constant in excess of 75 is a preferred dielectric material.

Lightning arresters in accordance with the present invention are particularly advantageous in an enclosed and gas insulated electrical power device which obtain more uniform voltage grading across the serially connected capacitors. While the invention has been described with reference to a specific embodiment the description is illustrative of the invention and is not to be construed as limiting the invention. Various modifications and applications may occur to those skilled in the art without departing from the true spirit and scope of the invention as defined by the appended claims.

What is claimed is:

1. A lightning arrester for use in a gas insulated electrical power device comprising a housing in association with said power device, a plurality of non-linearly resistive blocks connected by conductive means and forming serially connecting capacitors, said blocks including heat dissipation fins, and means within said housing to facilitate the flow of said gas about said resistive blocks.

2. A lightning arrester as defined by claim 1 wherein said means facilitating flow of gas comprises a barrier within said housing and defining a channel for the convection flow of gas within said housing.

3. A lightning arrester as defined by claim 2 wherein said blocks comprise zinc oxide.

4. A lightning arrester as defined by claim 1 wherein said blocks are serially connected by clamp means.

5. A lightning arrester as defined by claim 3 and further including metallic plates bonded to the ends of said blocks for providing capacitive voltage grading.

6. A lightning arrester as defined by claim 5 wherein said metallic plates extend outwardly from said blocks as heat dissipation fins.

7. A lightning arrester as defined by claim 6 wherein alternate ones of said heat metallic plates are cup shaped and are closely spaced from adjacent fins and comprise a part of said serially connected capacitors.

8. A lightning arrester as defined by claim 7 wherein said closely spaced fins are separated by high dielectric constant material.

9. A lightning arrester as defined by claim 8 wherein said gas comprises sulphur hexafluoride and said high dielectric constant material comprises barium titanate.

* * * * *